United States Patent
Chang et al.

[11] Patent Number: 6,061,689
[45] Date of Patent: *May 9, 2000

[54] OBJECT AGGREGATION REPRESENTATION OF RELATIONAL DATABASE ROWS HAVING NONTRADITIONAL DATATYPES

[75] Inventors: Daniel T. Chang, San Jose; Douglas M. Hembry; Basuki N. Soetarman, both of Los Gatos; Robert N. Summers, San Jose, all of Calif.

[73] Assignee: International Business Machines Corporation, Armonk, N.Y.

[*] Notice: This patent is subject to a terminal disclaimer.

[21] Appl. No.: 08/852,051

[22] Filed: May 6, 1997

[51] Int. Cl.$^7$ ................................. G06F 17/30
[52] U.S. Cl. ............... 707/103; 707/100; 707/104; 707/503; 707/504
[58] Field of Search ................. 707/103, 100, 707/504, 104, 503, 508, 1

[56] References Cited

U.S. PATENT DOCUMENTS

| | | | |
|---|---|---|---|
| 5,590,324 | 12/1996 | Leung et al. ................. | 707/5 |
| 5,627,979 | 5/1997 | Chang et al. ................. | 345/335 |
| 5,649,185 | 7/1997 | Antognini et al. ................. | 707/9 |
| 5,764,973 | 6/1998 | Lunceford et al. ................. | 707/1 |
| 5,768,158 | 6/1998 | Adler et al. ................. | 364/578 |
| 5,890,160 | 3/1999 | Hembry ................. | 707/103 |
| 5,924,100 | 7/1999 | Chang et al. ................. | 707/103 |
| 5,940,438 | 9/1999 | Chang et al. ................. | 707/103 |

OTHER PUBLICATIONS

Julie Anderson, The New Database Wars—Informix, IBM, Oracle, and Sybase each claims its object relational database will be the best, Informationweek, p. 45–48, Dec. 1996.

Doug Cooper et al., Oh Pascal!, W. W. Norton & Company Inc., p. 284–288, Dec. 1982.

Using Paradox 5 for Windows, Que Corporation, p. 143–146, Dec. 1994.

*Primary Examiner*—Anton W. Fetting
*Assistant Examiner*—Greta L. Robinson
*Attorney, Agent, or Firm*—Sughrue, Mion, Zinn, Macpeak & Seas, PLLC

[57] ABSTRACT

A program product is described in which a class library is provided to permit object oriented applications to access and to manipulate, in accordance with the object model, nontraditional data values of a relational table. Nontraditional datatypes of a relational table include multimedia and large object datatypes. The data is manipulable by virtue of extended data objects that each represent a cell of a relational row, and that each inherit type-specific behaviors from the class library. Special handling is provided for large objects.

31 Claims, 3 Drawing Sheets

Fig. 1
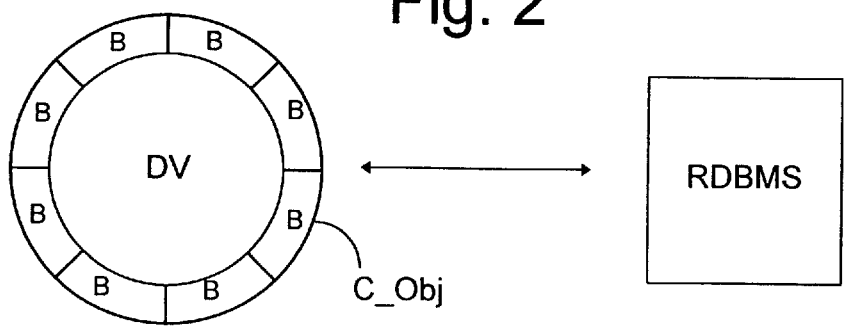
Fig. 2
Fig. 3
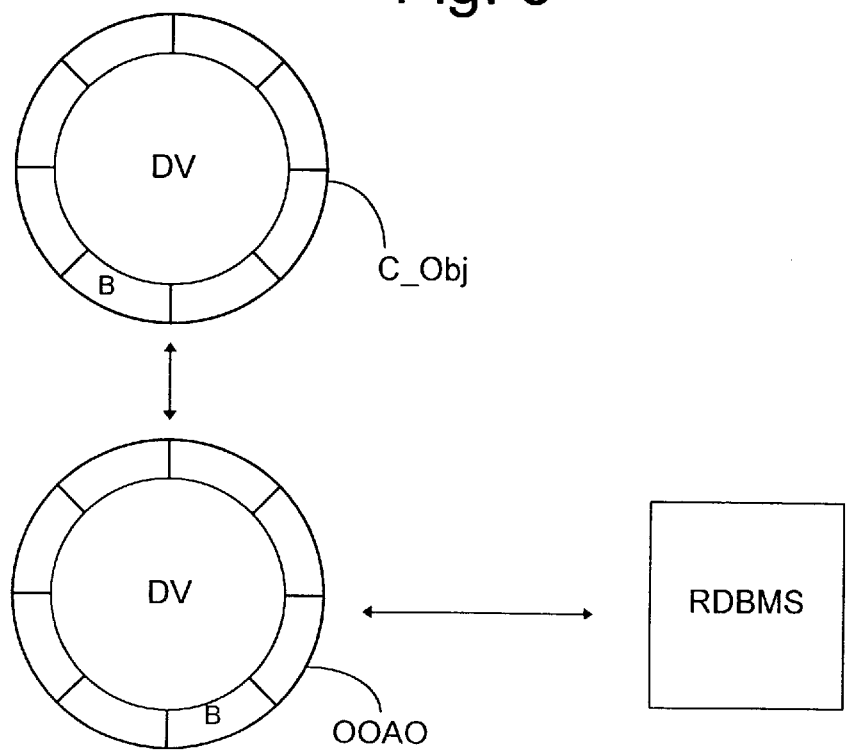

| Name | I.D. Image |
|---|---|
| Jane Jones | |
| John Smith | |

OBJECT AGGREGATION REPRESENTATION OF RELATIONAL DATABASE ROWS HAVING NONTRADITIONAL DATATYPES

FIELD OF THE INVENTION

This invention relates to object oriented programming and relational database management systems. In particular, this invention relates, in a computer system, to the object representation of relational database rows which contain columns having nontraditional datatypes. More particularly, such rows are represented as an aggregation of client objects.

BACKGROUND OF THE INVENTION

Relational database products, which are used in computer systems, now support nontraditional column datatypes such as audio and video. As used here, the term "computer systems" encompasses the widest possible meaning and includes, but is not limited to, standalone processors, networked processors, mainframe processors, processors in a client/server relationship, and embedded processors. When object oriented applications access rows of relational tables, the data value of the cell is retrieved into an object. The object makes available the value of the nontraditional datatype, but the manipulation of the value via behaviors or methods of the object is not accommodated. Such manipulation presently is possible only through calls to the database server. Thus, object oriented applications programs cannot access and manipulate nontraditional type data values from relational tables according to the object oriented programming paradigm.

SUMMARY OF THE INVENTION

This invention allows an object oriented client application to construct an aggregation of instances of several types of classes for the purpose of representing a single row in a relational table that contains one or more nontraditional datatypes.

The attributes and behavior of a nontraditional datatype in the database is preserved, where appropriate, in a corresponding class in the client, and are available to the client application.

The invention is primarily oriented towards the C++ programming language, but may be extended to other object oriented languages or environments capable of supporting its concepts, such as SMALLTALK, the MICROSOFT OLE/COM architecture, and others.

The above and other objects and advantages of the invention will become apparent from the following detailed description and with reference to the accompanying drawing figures.

BRIEF DESCRIPTION OF THE DRAWINGS

FIG. 1 shows a relational table.

FIG. 2 shows a client object directly communicating with an RDBMS.

FIG. 3 shows a client object using a data access facility to communicate with an RDBMS.

DETAILED DESCRIPTION OF THE PREFERRED EMBODIMENT

Figure 4:
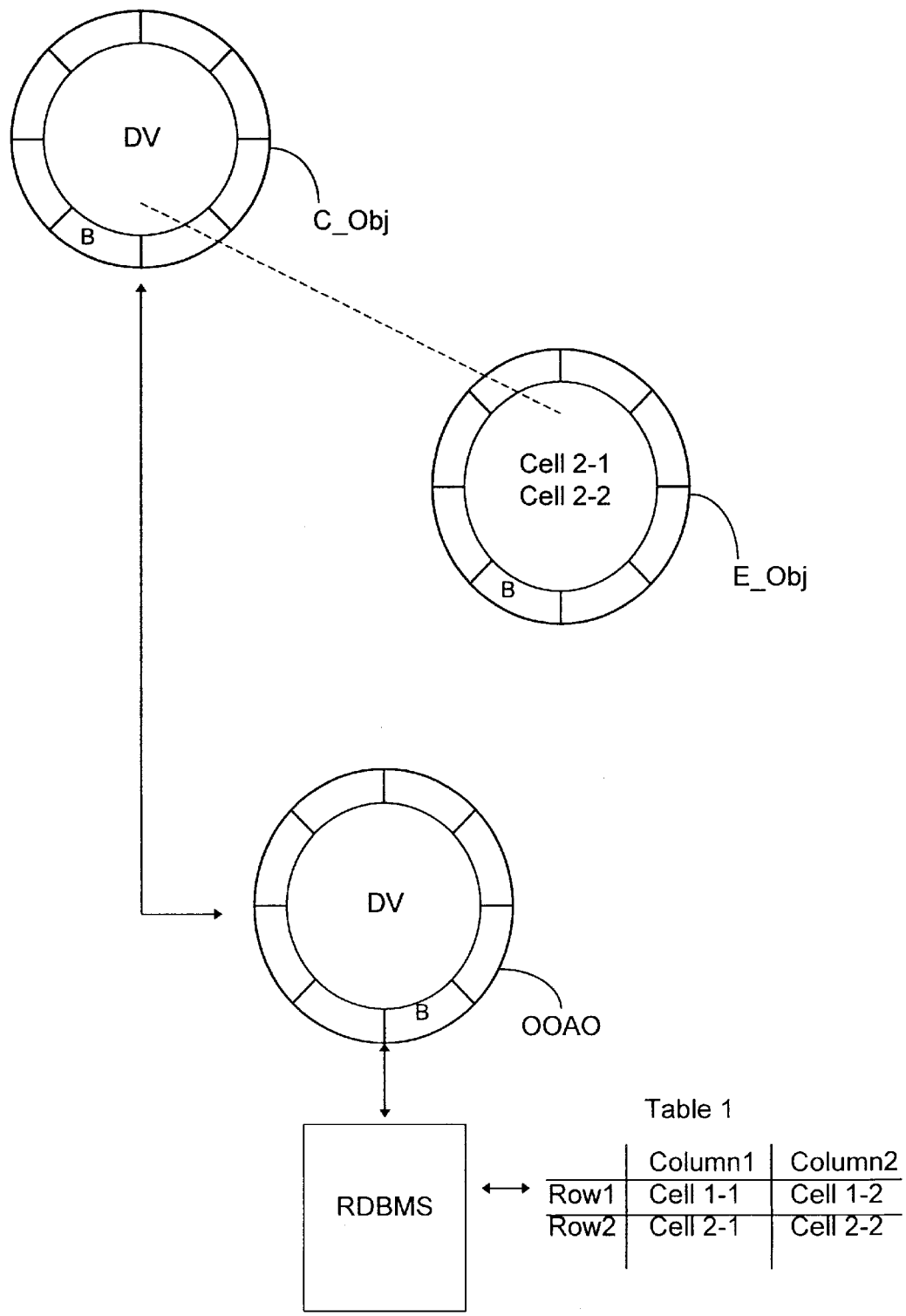
FIG. 4 shows the construction of an entity object in response to a client object request.

Computer applications programmers develop computer-based applications to fulfill end user needs. The advance of technology has made it possible to develop applications of great complexity. One of the key aspects of fulfilling end user needs is the correct representation of complex real-world systems.

The need to represent real-world systems in computer usable form has led to the existence of databases for storing, retrieving, and manipulating data. Applications programs may include internal logic to handle such tasks, but a more useful approach is to provide a set of computer programs that facilitates the creation, management, and manipulation of databases. Such a set of computer programs for managing one or more databases is a database management system. Using a database management system, an applications programmer may write an applications program without detailed, intimate knowledge of how or where the data is stored or retrieved. Thus, database management systems provide a measure of independence between the data of a database and the applications programs. This advantage may be referred to as data independence.

Data independence is desirable. Without data independence, a change in the structure of underlying data necessitates a corresponding change in the applications programs that rely on such a structure. The data independence provided by database management systems serves to avoid applications program modification.

In an environment having a database management system, applications programs communicate with an automated database manager. The database manager may be referred to as a database server. In particular, the applications programs may send messages to the database server in a predefined format. Such formatted messages may be referred to as database calls. A database call invokes one or more corresponding functions of the database management system, usually with respect to a particular database. A database management system provides applications programs with a variety of callable functions.

Every database management system is based on a general database model. The following are examples of well-known database models: the hierarchical model, the network model, and the relational model. A database management system based on the relational model may be referred to as a relational database management system (RDBMS). An RDBMS is a system of computer programs that facilitates the creation, management, and manipulation of relational databases.

Relational Database Management Systems

Every relational database is based on the relational model. The relational model is familiar to one of skill in the art. The book "An Introduction to Database Systems", by C. J. Date (Addison Wesley Publishing Company) provides an in-depth guide to the relational model, and hereby is incorporated in its entirety by reference. An example of an RDBMS is DB2, which commercially is available through International Business Machines Corporation.

According to the relational model, data is perceived to exist as a collection of relational tables. An example of a relational table is shown in FIG. 1.

A relational table expresses a relation between things. Relational tables are characterized by rows and columns (see FIG. 1). Although the rows and columns of relational tables may be employed in many ways, the relational model provides that columns pertain to entities or attributes of entities, and that rows pertain to specific instances of entities or specific instances of attributes of an entity.

The rows and columns of a relational tables intersect to define data cells.

Although the structure of the relational model provides for tables, rows, columns, and cells, a certain hierarchy may be observed within the model. That is, a relational database comprises one or more tables; each table comprises one or more rows; each row comprises one or more cells. Thus, the relational model defines four adjacent layers of hierarchy: databases, tables, rows, and cells. The tables layer is the next higher layer of the rows layer. The cells layer is the next lower layer of the rows layer. The tables layer is adjacent the rows layer, but is not adjacent the cells layer. Moreover, a given table may be referred to as an instance of the table layer, a given row as an instance of the row layer, and so on.

Although the relational terminology of tables, rows, columns, and cells is used throughout this description, one of skill in the art will appreciate that the concepts presented herein may be applied outside of the relational model to great advantage. In particular, the concepts are applicable in any database environment in which the data model similarly includes a hierarchy of adjacent layers.

The function calls that an applications program may make to the database server have a somewhat standardized structure that is tailored to the relational model. This structure for RDBMS function calls is generally referred to as the Structured Query Language (SQL).

Traditional and Nontraditional Datatypes

Each column of a relational table has a respective datatype. The datatype of a column restricts the values which the cells of that column may be. For instance, a traditional datatype for a column of a relational table is the integer datatype. If a column has the integer datatype, the cells of that column may have only integer values. Variations on the integer datatype include the small and the large integer datatypes. The small integer datatype is so named because it conventionally is limited in length to half of a word. The large integer datatype, by contrast, may be allocated two words.

Other traditional datatypes include packed decimal, floating point, fixed length character, and variable length character datatypes. The fixed length and variable length character datatypes, traditionally, have been limited to only a few thousand bytes (i.e., Kbytes) in length.

As is the case with the integer datatype, variations exist with respect to the other traditional datatypes. Some special purpose variations of the traditional datatypes include logical, money, date, and time.

One of skill in the art will appreciate that the traditional datatypes have, at their core, the concept of character or numeric data. Fixed length character and variable length character datatypes thus have in common an orientation on character data and a limitation to only a few thousand bytes in length. Integer, packed decimal, floating point, money, date, time, and logical datatypes can be viewed as having in common an orientation on numeric values.

Traditional datatypes are further characterized in that they are atomic. That is to say, a value stored in a cell has a simple, atomic structure instead of a complex structure. One of skill in the art will appreciate that lists and tables, for example, are non-atomic and therefore fall outside the definition of traditional datatypes. Although a list might be stored in a cell of a column that has the traditional character datatype, it is to be understood that, after storage of the list, the cell does not hold a list per se. That is, the cell holds a string of characters that make up what formerly was a list.

A list so stored loses its identity as a list, and can be manipulated by the RDBMS as only one atom of data.

For the purposes of the following discussion, therefore, the term "traditional" datatypes will be understood to encompass atomic numeric-oriented datatypes and atomic character-oriented datatypes of no more than a few Kbytes. The term "nontraditional" datatypes will be understood to refer to datatypes that do not fit the foregoing definition of traditional datatypes.

RDBMS's recently have been improved to provide support for some nontraditional datatypes. Some supported datatypes include images, video, fingerprints, large objects (LOBs), and audio. In other words, a cell of a relational table may now contain data that is an image, a video segment, a fingerprint, text of great length (such as a book), or an audio segment. Thus, the columns of a relational table now may have nontraditional datatypes as their respective datatypes.

Other nontraditional datatypes either presently are or soon will be supported. Examples of other nontraditional datatypes are spreadsheets, lists, and tables, to name but a few. Although a spreadsheet contains numeric and character information, one of skill in the art will appreciate that a spreadsheet is not atomic, and that the functionality offered by a typical spreadsheet goes well beyond the simple numeric-oriented and character-oriented traditional datatypes.

Applications Programs

As mentioned above, applications programs access the data of relational tables by making calls to a database server. Used in this sense, the term "applications programs" may refer to several separate programs, only one program, a module of a program, or even a particular task of a module.

An applications program may be written by an applications programmer. Applications programmers develop applications programs using any of a number of programming languages. During development and design of applications programs, applications programmers may adhere to a programming methodology. A programming methodology is a set of principles by which analysis is performed and by which design decisions are made. Programming methodologies may be referred to as programming paradigms. Examples of widely-known programming paradigms include the top-down, the data-driven, and the object oriented (OO) programming paradigms.

The Object Model

The OO paradigm is based on the object model. One of skill in the art readily understands the object model. For detailed information concerning the object model, a useful book, which herein is incorporated in its entirety by reference, is "Object-oriented Analysis and Design", by Grady Booch (Addison-Wesley Publishing Company).

Recently, object oriented analysis and design (OOAD) and object oriented programming (OOP) have been the focus of great attention. OOAD and OOP are thought to provide advantages with respect to abstraction, encapsulation, modularity, and hierarchy. Furthermore, OOAD is thought to provide for improved software reuse and better adaptability to change.

According to the object model, a software system is modeled as collections of cooperating objects. Individual objects are treated as instances of a particular class. Each class has a place within a hierarchy of classes.

An object is understood to have a unique identity, to have a state, and to exhibit behavior. The behavior of an object relates to the set of operations that may be performed by the object. Such operations are also known, interchangeably, as methods of the object or as member functions of the object.

Member functions of an object are invoked by passing the object an appropriate message.

An object may retain data of interest. Passing the object appropriate messages may invoke a member function of the object to manipulate the data. For example, an object presently might retain an image of the Washington Monument, and might have a member function for rotating an image. Under the object model, when an appropriate message, such as "rotate image 45 degrees", is passed to the object the rotating member function is invoked and the image is rotated 45 degrees. The image, thus rotated, is retained in this state.

The invoking of member functions of objects to perform tasks is a central concept of the OO paradigm.

Objects can be related to each other. Two objects might have a client/supplier relationship. Such objects are said to be linked. Two objects might have a hierarchical relationship. For example, one object might represent a finger and another a hand. The hand object may thus be said to be higher in a hierarchy than the finger. Assuming the hand has more than one finger, there might be several finger objects that are so related with the hand object. Hierarchically related objects are said to be aggregated. In particular, the hand object and its finger objects may be referred to as an aggregate, or an aggregation. The finger objects may be referred to as being attributes, or members of the aggregation. The hand object, by virtue of its position at the "top" of the hierarchy in the aggregation, may be referred to as an aggregating object.

An object cannot be considered without regard to its class. Every object, when constructed, receives its structure and behavior from its class. An object may be referred to as a class instance, or as an instance of a class. Classes, in the object model, may be hierarchically related. In particular, the relationship between two classes may be a subclass/superclass relationship. A subclass may inherit the structural and behavioral features of its superclass.

Thus, whenever an object is constructed, it receives important attributes from its class. If that class is a subclass of a particular superclass, the object may receive certain attributes from the superclass as well.

Class Libraries

Classes, on a practical level, are supplied in class libraries on any one of a variety of media. Furthermore, the class definitions contained in class libraries are actually statements written in a programming language. Such programming language statements, when executed by a computer, cause the computer to act in accordance with the particular content of the statements. Furthermore, a class library may be provided in any number of forms including, but not limited to, original source code, assembly code, object code, machine language, compressed or encrypted versions of the foregoing, and any and all equivalents.

One of skill in the art will appreciate that "media", or "computer-readable media", as used here, may include a diskette, a tape, a compact disc, an integrated circuit, a cartridge, a remote transmission via a communications circuit, or any other similar medium useable by computers. For example, to supply a class library, the supplier might provide a diskette or might transmit the class library in some form via satellite transmission, via a direct telephone link, or via the Internet.

Although a class library might be "written on" a diskette, "stored in" an integrated circuit, or "carried over" a communications circuit, it will be appreciated that, for the purposes of this discussion, the computer usable medium will be referred to as "bearing" the class library. Thus, the term "bearing" is intended to encompass the above and all equivalent ways in which a class library is associated with a computer usable medium.

For the sake of simplicity, therefore, the term "program product" is hereafter used to refer to a computer useable medium, as defined above, which bears a class library in any form.

Interaction Between OO Applications and RDBMS's

Tightly Coupled OO Applications

An OO applications program may access the data stored in a relational table by making function calls to the database server of the RDBMS in SQL (see FIG. 2). For example, a class might be defined to have behaviors B that: generate appropriate SQL statements; package the statements and forward them to the database server; receive the results; process the results; and so on. When such a program is executed, client objects C_Obj of the foregoing class would be constructed as necessary, and their behaviors B invoked in accordance with the particular task.

In FIG. 2, a particular client object C_Obj is depicted. An arbitrary set of Data values DV is held in the object. The object has an arbitrary number of behaviors B, also known as member functions.

This approach, however, is not desirable. In particular, the applications programmer must have an intimate knowledge of the RDBMS and its SQL function calls. The applications programs and the RDBMS become tightly coupled under this basic approach. A change to the RDBMS, therefore, often requires extensive changes in all of the tightly-coupled applications programs.

Another disadvantage of this approach is that applications programmers must depart from the object model with respect to accessing and manipulating data from the relational tables. Applications programmers must instead use and apply the relational model. In particular, applications programmers must fully understand SQL, must have detailed knowledge of the database schema, and must "switch" their thinking from the object model to the relational model.

Loosely Coupled OO Applications

An alternative approach is to provide an OO interface between the RDBMS and applications programs (see FIG. 3). That is, instead of making function calls directly to the database server of the RDBMS, a client object C_Obj may pass an appropriate message to an intermediate OO access facility (OOAO, for object oriented access object) which is responsible for direct communication with the database server.

Such a facility may be referred to as a data access product, a data access facility, or an object oriented access facility. One example of a data access product is the data access classes of the IBM OPEN CLASS LIBRARY, which commercially is available from International Business Machines Corporation.

The particulars of a data access facility are not the subject of the invention, and the precise manner in which a data access facility may be realized is omitted for the sake of clarity.

Some of the important services provided by a data access facility are a schema mapper and a class generator.

In functioning as an intermediary between applications programs and an RDBMS, a data access facility may provide one or more classes from which one or more intermediate objects are constructed. Objects of an applications program, which may be referred to as client objects, may pass messages to the objects of the data access facility. It will be assumed, for simplicity during the following discussion, that a data access facility provides one intermediary object. Such an intermediary object shall be referred to as an object oriented access object (OOAO).

Under this approach, client objects may be simplified because the OOAO has the responsibility for intimate knowledge of the database schema, of the precise syntax of SQL calls, and of the method of communicating with the database server. Applications programmers are thus freed from such responsibility, and can operate more completely under the object model. One important way in which the OOAO allows more complete operation under the object model is that, since the OOAO is itself an object, client objects communicate with it in the OO manner of passing messages to invoke member functions B.

An additional advantage to the loose coupling made possible by the data access facility is that a change in the underlying RDBMS is less likely to require a change in applications programs that access data in relational tables via the OOAO. The way the data access facility interacts with the changed RDBMS might need to be altered, but the data access facility may yet retain an identical external appearance with respect to its interactions with client objects.

Improved Object Model Support for OO Applications

In the arrangement according to FIG. 3, the OOAO provides values to the client object in response to the client object's message. So as to more closely adhere to the object model, however, it is desirable that. the OOAO return instead an object that represents the retrieved row. An object that represents a single retrieved row is hereafter referred to as an entity object. FIG. 4 shows such an arrangement.

In FIG. 4, a relational table "Table 1" is managed by an RDBMS. Table 1 has two rows (Row1 and Row2) and two columns (Column1 and Column2). At each row/column intersection is a cell. The four cells are named, for the purposes of this example, according to their row and then their column. Thus, the cell in the second row, first column is named Cell 2-1.

A OOAO of a data access facility communicates with the RDBMS in response to messages from a client object C_Obj. In this example, client object C_Obj has requested the OOAO to retrieve from the database a particular row of a particular table, to wit, Row2 of Table 1. The OOAO has responded by constructing an entity object E_Obj that represents Row2 of Table 1. The entity object E_Obj holds as data values DV the particular values of the cells of Row2. That is, the entity object holds the value of Cell 2-1 and the value of Cell 2-2.

The dashed line in FIG. 4 represents a link to the entity object. The OOAO constructs the entity object E_Obj and provides a link thereto to the client object C_Obj.

Assuming that the cell data values of the entity object are traditional datatypes, the approach as described in connection with FIG. 4 provides excellent support for the object model.

In particular, the OO applications program accesses relational data through client objects according to the object model's concept of objects passing messages to other objects. In other words, the client object need not communicate directly with the database server because it can pass messages to the OOAO. Thus, the request for data by the applications program is made substantially in accord with the object model.

The fact that an entity object is returned also strongly comports with the object model. That is, the OO applications program is provided not with mere data values, but with a link to an entity object that can be treated under the object model. Thus, the reply to the applications program's request for data fits within the object model.

The entity object constructed in response to the request of a client object is generally based on a class from a class library included in the data access facility. The classes from which entity objects are constructed provide support for the manipulation of cell data values if the cells come from columns having traditional datatypes. For example, Column1 of Table 1 in FIG. 4 might have an integer datatype which is a traditional datatype. As well, the entity object may be provided with member functions B that include operations such as add, subtract, and the like. For an entity object representing character data, the entity object may be provided with member functions B that perform substring, concatenation, deletion, and so on.

Thus, if an integer value were stored in Cell 2-1, the client object C_Obj might increment the value by having the OOAO retrieve the row Row2 into an entity object E_Obj, and then by passing the entity object E_Obj a message (not shown) to invoke the increment member function B, and then by passing the entity object a message (also not shown) to invoke the member function that updates the relational table with the present values stored in the entity object.

Support for Nontraditional Datatypes

The class libraries provided with data access facilities typically do not support nontraditional datatypes. That is, entity objects created by a data access facility have adequate methods to manipulate data values of the traditional datatypes, but do not have methods to manipulate data values of the nontraditional datatypes.

To explain this situation, the following example is provided. Returning to FIG. 4, it is to be assumed that Column1 has a datatype of character, which is a traditional datatype. Column2 has a datatype of image, which is a nontraditional datatype. In this example, the relational table includes employee names in Column1 and corresponding employee identification images in Column2. It is further to be assumed that Row2 pertains to the employee named "John Smith". Thus, Cell 2-1 contains the string "John Smith", and Cell 2-2 contains a digitized identification image in a particular image format.

The entity object E_Obj has methods B for the manipulation of the data value "John Smith". These methods may be invoked by passing the entity object an appropriate message in accordance with the object model.

The entity object does not, however, have methods for the manipulation of John's image. Suppose that it were desired to rotate the image clockwise one-quarter turn (ninety degrees). Since the entity object lacks an appropriate method, the image rotation cannot straightforwardly be manipulated in accordance with the object model.

Some RDBMS products provide server-based functions that manipulate data of a nontraditional datatype. To invoke such server-based functions, an appropriate SQL statement must be provided. For example, an SQL statement that might provide the desired rotation of an image data value could appear as follows:

SELECT ROTATE(TABLE1.COLUMN2,90)
    WHERE TABLE1.COLUMN1="John Smith".

According to this method, the image that originally was retrieved and found to be in need of rotation is not actually rotated. What happens with the use of server-based functions is that the image is re-retrieved from the table in the server, is rotated by the server, and is then provided in response to the SQL statement. The image manipulation occurs at the database server, and is performed by the RDBMS.

The use of server-based functions is disadvantageous also in that operation under the object method must temporarily be suspended whenever the manipulation of nontraditional datatypes is desired.

Class Library Program Product

According to the presently preferred embodiment of the invention, a class library program product is provided whereby the entity object is extended to hold extended data objects (EXOB's). For each column of a nontraditional datatype, one EXOB is constructed from an appropriate class of the class library. The class library program product may be referred to as an EXOB class library. The classes of the EXOB class library may generally be referred to as EXOB classes.

In particular, when an application accesses a cell of a relational table, and the cell contains a nontraditional datatype, an EXOB class instance of a matching type is instantiated in the application to represent that data. The EXOB instance will provide a public interface for adding, retrieving, updating, and deleting its data to and from the corresponding table location; for accessing the object's attributes; and for manipulating the data in various type-dependent ways.

Returning now to the "John Smith" example, in which Column1 of a relational table has a traditional character datatype and Column2 has a nontraditional image datatype, the invention is described in more detail with reference to FIGS. 5 and 6.

Figures 5, 6:
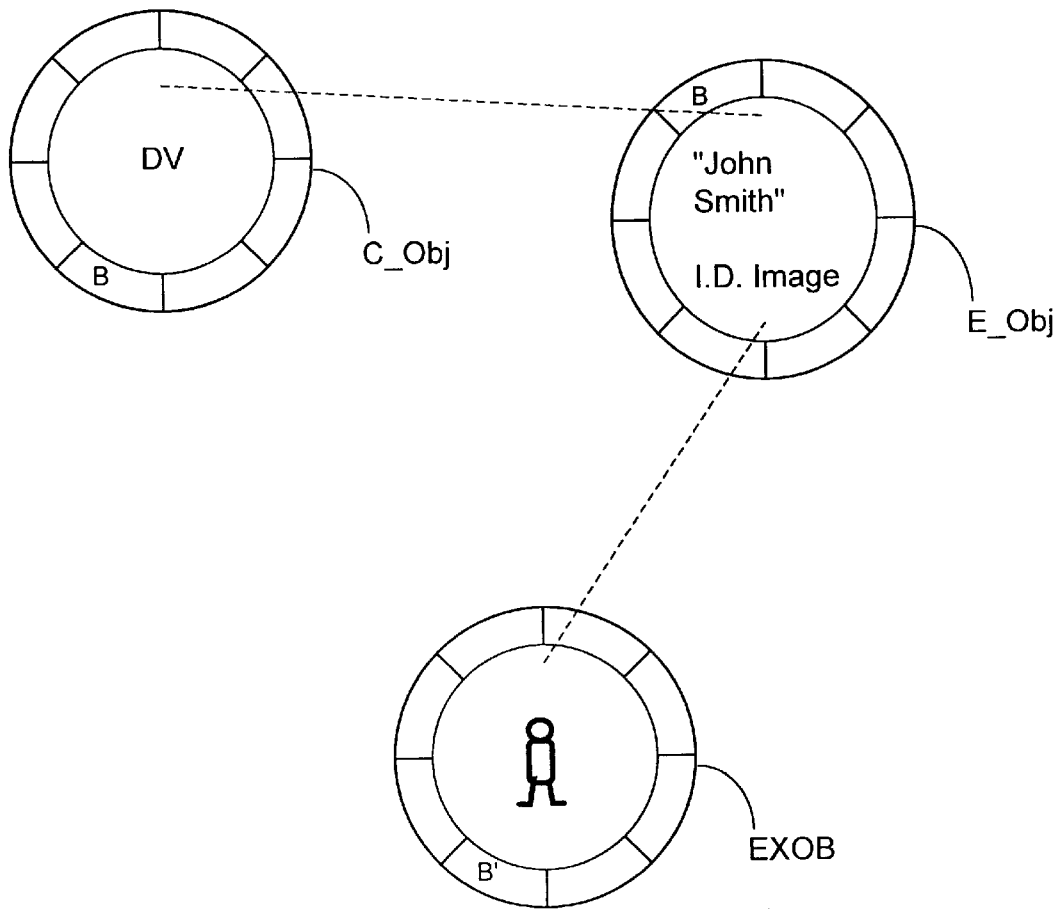
FIG. 5 shows a relational table containing data of a nontraditional datatype.
FIG. 6 shows an entity object that represents a relational row and that holds an extended data object representing the data value of a cell containing data of a nontraditional datatype.

FIG. 5 represents the foregoing relational table. It will be understood that the column called "Name" corresponds to Column1 in the earlier-described examples, and that the "I.D. Image" column corresponds to Column2. The first row of the table, which corresponds to Row1 in the earlier examples, thus contains two cells. The data value of the first cell of this row is of a character datatype by virtue of the datatype of the Name column, and happens to be "Jane Jones". The data value of the second cell of this row is of an image datatype by virtue of the image datatype of the I.D. Image column, and is a digitized image of Jane Jones. Likewise, the second row (Row2) also has two cells, the first of which contains the characters "John Smith" and the second of which contains a digitized image of John Smith.

FIG. 6 represents the entity object E_Obj that has been provided to the client object C_Obj as representing a row of the table shown in FIG. 5. For improved clarity, the RDBMS and OOAO are not shown in FIG. 6.

In this example, the requested row was Row2. Therefore, the entity object holds the data value of the cells in the row that are of a traditional data-type, to wit, the data value "John Smith". The entity object, as in previous examples, includes sufficient member functions B with which to manipulate such traditional datatype data values according to the object model.

The entity object, in order to handle the attributes and behavior of the image datatype, is extended to hold one EXOB for each of the retrieved row's cells having a nontraditional datatype. In this example, the retrieved row (i.e., Row2) has only one cell of a nontraditional datatype. Therefore, the entity object in this example is extended to hold only one EXOB. Together, the entity object and all of its EXOB's comprise an aggregation of objects that represent the row of the relational table. The entity object represents the row as an entity, and each retrieved data value of a nontraditional datatype is further represented by a respective EXOB.

The EXOB is constructed on the basis of a particular one of the EXOB classes. For each nontraditional datatype of the RDBMS, the EXOB class library includes a particular class within which the type-specific functions are defined. To put it another way, the EXOB that is instantiated to hold an image data value includes member functions that are specific to the manipulation of image data. Similarly, each EXOB class is expected to provide type-specific functions through which the client application can access and process its state data. In the example above, the table could have had a column of a particular nontraditional datatype: the LOB (for Large OBject). A LOB EXOB class might provide a function to export its data to a client file, from where a handler program such as a spreadsheet editor could process it.

The image EXOB class, in addition to a rotate feature, might provide functions to convert an image format, or to render and zoom a chosen area. For video data, a video EXOB class could provide video-specific operations to invoke an operating system streaming service (such as MMPM/2 for OS/2), and to locate selected frames or scenes within a clip.

As one knowledgeable in the art will appreciate, the location of selected frames within a video clip may be referred to as a type-specific behavior of the video EXOB class. The zooming of a portion of an image may be referred to as a type-specific behavior of the image EXOB class. Clearly, zoom could also be useful with respect to video frames, and so a type-specific behavior of one class need not be a behavior that is useful exclusively for that class. A type-specific behavior of a class is a behavior that is useful with respect to that class, but is not provided by the set of behaviors defined for traditional datatypes.

In other words, since zoom is not within the behaviors defined for traditional datatypes, if zoom is provided as a behavior for the image EXOB class then zoom is a type-specific behavior of that class. Also, if zoom is provided as a behavior for the video EXOB class, it likewise is a type-specific behavior of the video EXOB class.

In each case the public interface of the class would be designed to match the characteristics and usage of the particular nontraditional datatype in the client environment.

Various procedures by which the entity object and the EXOB's are instantiated are possible. In one approach, the data access facility has the responsibility for ensuring the creation of EXOB's. In another approach, the responsibility could be left to the applications programmer. The former approach is preferable because it avoids further burdening the applications programmer.

According to this preferred embodiment, therefore, the EXOB member objects are created when the entity object itself is created. That is, the OOAO in the above example creates the entity object and, at the same time, creates all required EXOB's, forming the entity object and the EXOB's into an aggregation. In the aggregation, the EXOB's may be referred to as being members of the aggregation, and the entity object may be referred to as the aggregating object of the aggregation.

A document entitled "Extended Data Objects (XDO) Class Library—High Level Specification and Design", available from International Business Machines Corporation, provides a concrete example of one embodiment of the invention as applied in a DB2 relational database environment; the document is incorporated by reference in its entirety.

The advantages of this preferred embodiment of the invention are manifold. The most important advantage, however, may reside in the fact that the EXOB class library program product permits applications programmers to operate more completely under the object model than previously has been possible. In particular, the applications programmer need not himself directly invoke server-based functions to manipulate nontraditional datatype data values. The applications programmer can, instead, invoke methods of objects in accordance with the object model. Through the entity object, the applications programmer has OO access to not only the nontraditional datatype data values, but also the member functions with which to perform the desired manipulation.

Additional Considerations for Accessing LOB's

LOB's are a nontraditional datatype that pose particular handling problems. It is desirable that a program product include the wherewithal to accomplish the piecemeal processing of very large LOBs, and, if possible, to allow the manipulation of the LOB on the server, sending only essential portions to the client.

Since server-based manipulation of data has heretofore required departure of from the OO paradigm, the invention provides for member functions, for EXOB's of the LOB EXOB subclass, that accommodate particularly advantageous LOB access methods.

It is also desirable to defer LOB fetches until the data actually is required. With LOB's of a certain size or smaller, however, it may be more efficient to send the whole LOB to the client than to manipulate it by parts.

In the database itself, a LOB is directly held by the relational table. When an applications programmer desires to retrieve and to manipulate a LOB at the client, the applications program typically may be written so as directly to issue a request to which the RDBMS reacts by providing a copy of the LOB itself. On the other hand, when an applications programmer finds it more desirable or efficient to avoid transfer of the LOB to the client, the applications program may be written so as directly to issue a request to which the RDBMS responds by providing only a pointer to the LOB. Such a pointer shall be referred to as a LOB locator.

In other words, the database selectably sends the entire LOB, or generates and sends a LOB locator that points to the LOB. There are therefore at least two methods of manipulating LOB's, to wit, direct LOB manipulation and LOB manipulation using LOB locators. These two methods of manipulating LOB's may be referred to as two LOB access methods, or LAM's. In the following discussion, the method of direct LOB manipulation (i.e., manipulation at the client) shall be referred to as the direct LAM, and the method of LOB manipulation using LOB locators shall be referred to as the indirect LAM (i.e., manipulation at the server).

In an embodiment of the invention, managing the storage and retrieval of LOBs and the generation of LOB locators is a function of the RDBMS. Since the RDBMS is responsible for these functions, SQL statements must normally be provided to the RDBMS so as selectably to retrieve a LOB or a LOB locator.

Operation with the direct LAM according to the invention will now be described in the context of a retrieval from a relational table.

The direct LAM is substantially similar to the already-described method of accessing any other cell of a nontraditional datatype. That is, the client object sends a message to the OOAO requesting access to at least the particular cell. The OOAO returns an entity object representing the row, and the entity object has as a member of its aggregation an EXOB representing the particular cell having the nontraditional datatype of LOB.

The EXOB is caused to retrieve. This may be caused by the entity object, e.g., or by the OOAO or the client object, depending on the exact implementation of the data access facility and the circumstances. Since the direct LAM is being employed, the EXOB requests the LOB itself from the OOAO. The LOB is sent over the network to the EXOB, thus providing a retrieved copy of the LOB in the EXOB.

Operation with the indirect LAM according to the invention is different, and will now be described in the context of another retrieval from a relational table.

Here, the client object sends a message to the OOAO requesting access to at least the particular cell. The OOAO returns an entity object representing the row, and the entity object has as a member of its aggregation an EXOB representing the particular cell having the nontraditional datatype of LOB.

The EXOB is caused to retrieve. Since the indirect LAM is being employed, the EXOB requests a LOB locator from the OOAO. The LOB is not sent to the EXOB. Rather, the OOAO causes the RDBMS to generate a LOB locator. The LOB locator is what is returned to the EXOB.

The advantages of the indirect LAM may be better understood by the following example, which contrasts the affects of passing an integer over a network with the affects of passing a LOB over the network.

Assume that an integer value is stored in a particular location of a first table (i.e., a particular row and cell). It is desired, e.g., that the value of that cell be copied to a particular location of a second table. The integer value is retrieved from the first table (which is in the server) to the client (via the network) by an applications program, and then written back from the client (via the network) to the desired location in the second table (which is in the server). Since the value is an integer value, virtually no network impact is realized.

Now assume that a LOB, instead of an integer value, is what must be copied from the first to the second table. If the direct LAM is employed, the LOB is retrieved from the first table (which is in the server) to the client (via the network), and then is written back from the client (via the network) to the desired location in the second table (which is in the server). The LOB thus traverses the network two times, even though no modification to the LOB data itself is made.

This is an excellent example of a case in which the indirect LAM should have been employed. That is, the applications program, by appropriately employing the indirect LAM, could have caused the RDBMS to provide a LOB locator instead of a LOB.

Using the indirect LAM, a LOB locator generated on the basis of the location of the LOB in the first table would have been provided by the RDBMS from the server to the client's applications program, and then the LOB locator subsequently could have been used by the applications program to cause the RDBMS to store the actual LOB in the desired location in the second table. Since the LOB locator has a length that is negligible in comparison to the length of a LOB, virtually no network impact would have been realized.

According to the invention, the LOB EXOB subclass defines member functions whereby an OO applications program may, without leaving the OOP, selectably set the RDBMS to return a LOB or a LOB locator. In other words, the invention provides for member functions whereby an object of the LOB EXOB subclass may explicitly set the LAM. In addition, the invention provides for member functions whereby an object of the LOB EXOB subclass may set an automatic LAM, which will now be described in detail.

According to the invention, when the automatic LAM is set in the EXOB, functionality is provided whereby, if the LOB is small enough, the database will be prompted by the EXOB to transmit the entire LOB to the requesting object (i.e., the direct LAM will be employed). If, in the judgment of the object, the LOB is too large for the direct LAM, then LOB locators are used (i.e., indirect LAM is used) and manipulation is performed at the database server.

In a preferred embodiment, when the automatic LAM is set, it is assumed that LOB locators are to be used. Prior to the actual retrieval, however, the length of the LOB is evaluated, and a decision is made by the EXOB as to whether to use LOB locators or to request the LOB value in its entirety. If the LOB length is below a predetermined threshold, then the LOB is requested. If the length is at or above the threshold, then a LOB locator is requested. The evaluation is performed by a specially-provided member function defined in the LOB EXOB class (and, inherently, available in the LOB EXOB object).

Preferably, the invocation of any member function involving an initial retrieval from the database, or involving a change in the length of the LOB (such as a concatenation operation, for example). Putting the data back to the database does not normally require a re-evaluation, because the data must be written from wherever it is regardless of length.

To explain further, assume that a LOB is requested, and that it has a length that is less than the threshold. Since the automatic LAM happens to be in effect, the LOB itself is sent across the network to the EXOB. Now assume the size of the LOB is significantly increased in some manner (perhaps a concatenation). The length of the LOB might now exceed the threshold. Even if it does, an operation to store the LOB back to the database must occur across the network in any event, because the EXOB has the only copy of the LOB that is current. Thus, even if the LOB's length is greater than the threshold, the LOB must be sent across the network.

*Mutatis mutandis*, the same is true when a LOB is accessed initially via a LOB locator, and then diminished in length below the threshold. The LOB, as changed, must be accessed with the LOB locator for the store operation.

Performing a binary LOB function gives rise to the potential need for special handling of LOB's. A binary LOB function, in this sense, is one that involves two LOB's. Concatenation is a good example of a binary LOB function. In concatenation, two LOB's may be joined into one other LOB. The two LOB's operated on in a binary LOB function are here referred to as operands of the binary LOB function.

In any binary LOB function, the need for special consideration arises because the operands must be both at the same location. To explain, it is assumed that one LOB is being directly accessed and the other is being indirectly accessed. Such a situation poses a problem because the one EXOB at the client has the one LOB, but the other EXOB has only the LOB locator that indicates the other LOB (which is still at the server). Combining the one LOB with the LOB locator of the other LOB would provide an erroneous result.

To avoid an erroneous result, member functions of EXOB's involving binary LOB functions are adapted to ensure that both operands are at the same location by moving one LOB to the same location as the other. At this time, since LOB movement is required, an evaluation may be performed to determine the most efficient alternative.

Given the above description, one knowledgeable in the art will appreciate that the evaluation of LOB length may be implemented in a variety of ways. One way is that the evaluation against a threshold is always performed, regardless of the LAM. For example, where the direct LAM is desired, the internal workings of the system might provide that the threshold used in detecting too-large LOB's is so high that no LOB will be long enough to exceed the threshold. Where the indirect LAM is desired, the threshold used might be set to zero so that no LOB will be short enough to be less than the threshold. Where the automatic LAM is desired, the threshold might be adjusted to the earlier-described predetermined threshold. Of course, the predetermined threshold for the automatic LAM could be made settable by the user or be based on system-related criteria.

The selection of the indirect LAM, the direct LAM, or the automatic LAM may advantageously be set as a default for the object by invoking appropriate member functions of the object. In other words, each given LOB EXOB is provided with a member function that is adapted to receive a message indicating that the direct LAM, for example, is to be used for all future LOB accesses. Even more advantageously, LOB EXOB's constructed by the given LOB EXOB may be initially set with the default LAM of the given LOB EXOB.

A default LAM may thus be selected by sending the EXOB an appropriate message. The default LAM may similarly be modified as needed.

All of the above-identified member functions permit true OO manipulation of LOB's, regardless of whether the LOB is at the client in the EXOB, or the LOB is manipulated at the server using LOB locators. In either case, retrieval operations, modification operations, and storage operations are performed by sending messages to objects. Even the LAM is set by send the appropriate message to the EXOB.

Therefore, even though the OO applications programmer may wish to have LOB's be kept at the server, and may use LOB locators, the programmer may remain squarely within the OO paradigm. The applications programmer need not use SQL to cause generation of LOB locators, because this is taken care of by the member functions of the LOB EXOB subclass.

Other advantages of this aspect of the invention may be summarized as follows. Fetch of the object data is deferred until it is needed. A client can set the persistent location of the object without issuing an explicit retrieve call. Subsequently, any function that requires the data causes an implicit retrieve of the LOB cell data. In some applications this may save a significant amount of unnecessary fetching of data. Two alternative forms of storage are provided, one at the client, and the other on the server. For large LOBs and certain types of processing, the locators can be significantly faster than the alternative of moving the whole LOB to the client. The length of the LOB need not be re-evaluated for every operation, but depending on the particular member function being performed.

We claim:

1. In a computer system having a database under control of a database management system which supports a traditional datatype and a nontraditional datatype, said database including a table with rows and columns, cells being defined by intersections of said rows and said columns, one of said rows having respective cells each with one of said traditional datatype and said nontraditional datatype, a data access method for an applications program to access a respective data value of each of said respective cells of said one of said rows, said method comprising:

providing to said applications program an entity object representing said one of said rows;

for each of said respective cells that has said traditional datatype, said entity object providing said respective data value; and for each of said respective cells that has said nontraditional datatype, providing to said entity object a corresponding extended data object which represents said each respective cell, said corresponding extended data object providing said respective data value.

2. The data access method according to claim 1, wherein said nontraditional datatype is one of:
- an image datatype pertaining to image data,
- a video datatype pertaining to video data,
- an audio datatype pertaining to audio data, and
- a large object datatype pertaining to data that has a length greater than 32 Kbytes.

3. A program product, comprising:
- a class library, and
- a computer-readable medium bearing said class library;
- said class library including:
  - a first class for constructing entity objects, each representing a respective row of a relational table and at least one traditional datatype cell of said row, and
  - a second class for constructing extended data objects, each representing a nontraditional datatype cell of said row.

4. The program product according to claim 3, wherein said first class provides said each entity object with respective member functions for causing construction of one of said extended data objects for each said nontraditional datatype cell of said represented row.

5. The program product according to claim 4, wherein said second class provides said each extended data object with respective member functions for manipulating a data value of said nontraditional datatype cell.

6. A program product, comprising:
- a class library, and
- a computer-readable medium bearing said class library;
- said class library including:
  - a first class for constructing entity objects, each representing a respective row of a relational table and at least one traditional datatype cell of said row,
  - a second class for constructing extended data objects, each representing a nontraditional datatype cell of said row, and
  - third class based on said second class for constructing, as one of said extended data objects, a large object (LOB) extended data objects;
- said first class providing said each entity object with respective member functions for causing construction of one of said extended data objects for each said nontraditional datatype cell of said represented row;
- said second class providing said each extended data object with respective member functions for manipulating a data value of said nontraditional datatype cell;
- said LOB extended data object representing said nontraditional datatype cell of said represented row when said nontraditional datatype cell has a LOB nontraditional datatype, said relational table being controlled by a database management system at a server location, and said LOB extended data object having a client location;
- said third class defining member functions of said LOB extended data object, including a function for setting a LOB access mode of said LOB extended data object to a direct method, a function for setting said LOB access mode to an indirect method, and a function for performing a retrieval with respect to said selected cell;
- said member functions of said LOB extended data object being defined by said third class so that:
  - when said direct method is set, said retrieval is performed by causing said database management system to provide to said LOB extended data object said LOB value so that manipulation of said LOB value may be performed at said client location;
  - when said indirect method is set, said retrieval is performed by causing said database management system to provide to said LOB extended data object a LOB locator, said LOB locator being usable by said database management system so that manipulation of said LOB value may be performed at said server location.

7. The program product according to claim 6, wherein:
- said third class further defines said member functions of said LOB extended data object to include a function for setting said LOB access mode to an automatic method;
- said member functions of said LOB extended data object are defined by said third class so that:
  - when said automatic method is set, and said LOB value has a length that exceeds a predetermined threshold, said retrieval is performed according to said direct method; and
  - when said automatic method is set, and said length of said LOB value does not exceed said predetermined threshold, said retrieval is performed according to said indirect method.

8. The program product according to claim 7, wherein:
- said third class further defines said member functions of said LOB extended data object to include a comparing function for comparing said length of said LOB value with a threshold;
- said member functions of said LOB extended data object are defined by said third class so that said comparing function is invoked when said function for performing a retrieval is invoked, and in response to a change in said length of said LOB value.

9. The program product according to claim 8, wherein:
- said third class further defines said member functions of said LOB extended data object to include a binary LOB function having two operands; and
- said member functions of said LOB extended data object are defined by said third class so that, when said binary LOB function is invoked, said LOB extended data object determines whether both operands of said binary LOB function are co-located.

10. The program product according to claim 9, wherein said member functions of said LOB extended data object are defined by said third class so that, when said operands are not co-located, said LOB extended data object causes one of said operands to be located with the other one of said operands prior to execution of said binary LOB function.

11. The program product according to claim 8, wherein said member functions of said LOB extended data object are defined by said third class so that:
- setting said LOB access method to said indirect method is accomplished by adjusting said threshold of said comparing function to a value less than a smallest allowable value for said large LOB extended data object datatype;
- setting said LOB access method to said direct method is implemented by adjusting said threshold of said comparing function to a value greater than a greatest allowable value for said large LOB extended data object datatype; and
- setting said LOB access method to said automatic method is accomplished by adjusting said threshold of said comparing function to said predetermined threshold.

12. A program product for use with a computer system in which relational tables of a relational database management system are accessed by an applications program, said program product comprising:
- a computer usable medium bearing computer programming statements for causing said computer system to respond to an access request of said applications program for access to data cells of a row of one of said relational tables by providing (A) an entity object representing said row and having traditional type data values for each of said cells of a traditional datatype, and (B) for each of said data cells that has a nontraditional datatype, an extended data object representing said cell and having a respective nontraditional type data value.

13. The program product according to claim 12, wherein said computer programming statements include a class library with an entity object class and an extended data object class.

14. A program product for use with a computer system in which relational tables of a relational database management system are accessed by an applications program, said program product comprising:

a computer usable medium bearing computer programming statements for causing said computer system to respond to an access request of said applications program for access of data cells of a row of one of said relational tables by providing (A) an entity object representing said row and having traditional type data values for each of said cells of a traditional datatype, and (B) for each of said data cells that has a nontraditional datatype, an extended data object representing said cell and having a respective nontraditional type data value, said computer programming statements including a class library with an entity object class and an extended data object class, said computer programming statements defining a data access facility that provides at least one object oriented access object to which said access request of said applications program is provided, and said data access facility responding to said access request by providing said entity object to said applications program.

15. The program product according to claim 14, wherein said entity object includes member functions for creating said extended data object, said extended data object being created from said class library on the basis of the particular nontraditional datatype of said cell so that said extended data object has a respective set of member functions for type-specific manipulation of said nontraditional type data value.

16. A computer system, comprising:

a relational database management system with relational tables, a data access facility for interfacing with said relational database management system to provide access to said relational tables, and an applications program for accessing one of said relational tables using said data access facility;

wherein said data access facility responds to an access request of said applications program for access to data cells of a row of one of said relational tables by providing:

an entity object representing said row and having traditional type data values for each of said cells of a traditional datatype, and for each of said data cells that has a nontraditional datatype, an extended data object representing said cell and having a respective nontraditional type data value.

17. The computer system according to claim 16, further comprising:

a class library with an entity object class and an extended data object class;

wherein said entity object is based on said entity object class; and wherein said extended data object is based on said extended data object class.

18. The computer system according to claim 17, wherein said data access facility provides at least one object oriented access object to which said access request of said applications program is provided, and wherein said data access facility responds to said access request by providing said entity object to said applications program.

19. A computer system, comprising:

a relational database management system with relational tables, a data access facility for interfacing with said relational database management system to provide access to said relational tables, an applications program for accessing one of said relational tables using said data access facility, and a class library with an entity object class and an extended data object class;

wherein said data access facility responds to an access request of said applications program for access to data cells of a row of one of said relational tables by providing:

an entity object representing said row and having traditional type data values for each of said cells of a traditional datatype, and for each of said data cells that has a nontraditional datatype, an extended data object representing said cell and having a respective nontraditional type data value;

wherein said entity object is based on said entity object class;

wherein said extended data object is based on said extended data object class;

wherein said data access facility provides at least one object oriented access object to which said access request of said applications program is provided;

wherein said data access facility responds to said access request by providing said entity object to said applications program; and wherein said entity object includes member functions for creating said extended data object, said extended data object being created from said class library on the basis of the particular nontraditional datatype of said cell so that said extended data object has a respective set of member functions for type-specific manipulation of said nontraditional type data value.

20. In a computer system having a database under control of a server-based database management system which supports traditional and nontraditional datatypes, including a large object (LOB) nontraditional datatype, said database including a table with rows and columns, cells being defined by intersections of said rows and said columns, said cells of a selected one of said rows including a cell of said LOB datatype, a data access method for a client-based applications program to access and manipulate a LOB value of said cell of said LOB datatype, said method comprising the steps of:

providing to said applications program, in response to a request therefrom, an entity object representing said selected row;

providing to said entity object said respective data value for said respective cells of said selected row that have said traditional datatypes;

providing to said entity object a respective extended data object for each of said respective cells of said selected row that have said nontraditional datatypes, each said respective extended data object representing a corresponding one of said respective cells that have said nontraditional datatypes;

wherein when said corresponding cell is said cell of said LOB datatype, said respective extended data object thereof is a LOB extended data object having member functions including functions for:

setting a LOB access mode of said LOB extended data object to a direct method, and setting said LOB access mode to an indirect method;

wherein:

when said direct method is set, said respective LOB extended data object of said cell of said LOB datatype responds to a retrieval request of said applications program by causing said database management system to provide to said LOB extended data object said LOB value, said manipulation of said LOB value occurring at said client by said LOB extended data object;

when said indirect method is set, said LOB extended data object responds to said retrieval request by causing said database management system to provide a LOB locator usable by said database management system, said manipulation of said LOB value occurring at said server;

said applications program accesses and manipulates said LOB value by sending a message to said LOB extended data object.

21. The data access method according to claim 20, wherein:

said member functions of said LOB extended data object further include a function for setting said LOB access mode to an automatic method;

when said automatic method is set, and said LOB value has a length that exceeds a predetermined threshold, said LOB extended data object responds to said retrieval request by causing said database management system to provide to said LOB extended data object said LOB value, said manipulation of said LOB value occurring at said client by said LOB extended data object; and when said automatic method is set, and said length of said LOB value does not exceed said predetermined threshold, said LOB extended data object responds to said retrieval request by causing said database management system to provide a LOB locator usable by said database management system, said manipulation of said LOB value occurring at said server.

22. The data access method according to claim 21, wherein:

said member functions of said LOB extended data object further include a comparing function for comparing said length of said LOB value with a threshold;

said comparing function is invoked in response to said retrieval request; and said comparing function is invoked in response to a change in said length of said LOB value.

23. The data access method according to claim 22, wherein:

said member functions of said LOB extended data object further include a binary LOB function; and when said binary LOB function is invoked, said LOB extended data object determines whether both operands of said binary LOB function are co-located.

24. The data access method according to claim 23, wherein when said operands are not co-located, said LOB extended data object causes one of said operands to be located with the other one of said operands prior to execution of said binary LOB function.

25. The data access method according to claim 22, wherein:

setting said LOB access method to said indirect method is accomplished by adjusting said threshold of said comparing function to a value less than a smallest allowable value for said large object datatype;

setting said LOB access method to said direct method is implemented by adjusting said threshold of said comparing function to a value greater than a greatest allowable value for said large object datatype; and setting said LOB access method to said automatic method is accomplished by adjusting said threshold of said comparing function to said predetermined threshold.

26. A computer system, comprising:

a database, including a table with rows and columns, cells being defined by intersections of said rows and said columns, a server-based database management system controlling said database and supporting traditional and nontraditional datatypes, including a large object (LOB) datatype, said cells of a selected one of said rows having a cell of said LOB datatype, a data access facility interfacing with said database management system, and a client-based applications program for accessing and manipulating a LOB value of said cell of said LOB datatype;

said data access facility providing to said applications program, in response to a request therefrom, an entity object representing said selected row and providing to said entity object said respective data value for said respective cells of said selected row that have said traditional datatypes;

said data access facility providing to said entity object a respective extended data object for each of said respective cells of said selected row that have said nontraditional datatypes, each said respective extended data object representing a corresponding one of said respective cells that have said nontraditional datatypes;

wherein when said corresponding cell is said cell of said LOB datatype, said respective extended data object thereof is a LOB extended data object having member functions including functions for:

setting a LOB access mode of said LOB extended data object to a direct method, and setting said LOB access mode to an indirect method;

wherein:

when said direct method is set, said respective LOB extended data object of said cell of said LOB datatype responds to a retrieval request of said applications program by causing said database management system to provide to said LOB extended data object said LOB value, said manipulation of said LOB value occurring at said client by said LOB extended data object;

when said indirect method is set, said LOB extended data object responds to said retrieval request by causing said database management system to provide a LOB locator usable by said database management system, said manipulation of said LOB value occurring at said server;

said applications program accesses and manipulates said LOB value by sending a message to said LOB extended data object.

27. The computer system according to claim 26, wherein:

said member functions of said LOB extended data object further include a function for setting said LOB access mode to an automatic method;

when said automatic method is set, and said LOB value has a length that exceeds a predetermined threshold, said LOB extended data object responds to said retrieval request by causing said database management system to provide to said LOB extended data object said LOB value, said manipulation of said LOB value occurring at said client by said LOB extended data object; and when said automatic method is set, and said length of said LOB value does not exceed said predetermined threshold, said LOB extended data object responds to said retrieval request by causing said database management system to provide a LOB locator usable by said database management system, said manipulation of said LOB value occurring at said server.

28. The computer system according to claim 27, wherein:

said member functions of said LOB extended data object further include a comparing function for comparing said length of said LOB value with a threshold;

said comparing function is invoked in response to said retrieval request; and said comparing function is invoked in response to a change in said length of said LOB value.

29. The computer system according to claim 28, wherein:

said member functions of said LOB extended data object further include a binary LOB function; and when said binary LOB function is invoked, said LOB extended data object determines whether both operands of said binary LOB function are co-located.

30. The computer system according to claim 29, wherein when said operands are not co-located, said LOB extended data object causes one of said operands to be located with the other one of said operands prior to execution of said binary LOB function.

31. The computer system according to claim 28, wherein:

setting said LOB access method to said indirect method is accomplished by adjusting said threshold of said comparing function to a value less than a smallest allowable value for said large object datatype;

setting said LOB access method to said direct method is implemented by adjusting said threshold of said comparing function to a value greater than a greatest allowable value for said large object datatype; and setting said LOB access method to said automatic method is accomplished by adjusting said threshold of said comparing function to said predetermined threshold.

* * * * *